Figure 1:
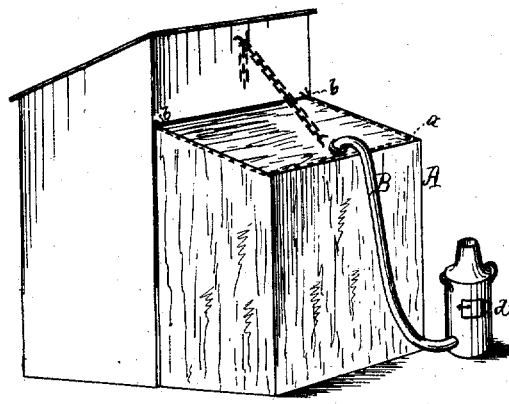

W. PAINTER.
Apparatus for the Removal of Night-Soil.
No. 160,701. Patented March 9, 1875.

UNITED STATES PATENT OFFICE.

WILLIAM PAINTER, OF BALTIMORE, MARYLAND.

IMPROVEMENT IN APPARATUS FOR REMOVAL OF NIGHT-SOIL.

Specification forming part of Letters Patent No. 160,701, dated March 9, 1875; application filed December 22, 1874.

*To all whom it may concern:*

Be it known that I, WILLIAM PAINTER, of the city and county of Baltimore, in the State of Maryland, have invented a new and useful method of controlling offensive vapors incident to night-soil operations and apparatus therefor; and I do hereby declare that the following specification, taken in connection with the drawings furnished and forming a part thereof, is a clear, true, and accurate description of the same.

There has long existed a recognized necessity for the invention and introduction of a practicable method and means whereby night-soil and other offensive domestic matter may be removed from its receptacles without creating such nuisances as are always offensive and frequently injurious to health. The object of my invention is to control the noisome vapors necessarily evolved from night soil of that character which prevents its practical removal by any of the odorless excavating apparatus already invented and patented by me. It frequently occurs that said matter is so solid in its nature that it must be removed from the receptacle with scoops or shovels and deposited in barrels specially fitted for its transit. This operation is obviously attended by the exhalation of the worst form of stenches, rendering the immediate neighborhood almost intolerable. To obviate this nuisance chemical deodorizers have been proposed, and to some extent practiced, with results more or less valuable. By my novel method of controlling the offensive vapors the operation of removing night-soil or other fetid matter to vessels for transit may be practically executed without offense in any serious degree to any persons save those engaged in the operation.

My said invention consists, mainly, in controlling the offensive vapors by means of a stench-screen, which, during the operation of removing the fetid matter from the sink to the transit-vessels, incloses the entrance to the sink, the barrels, and the operatives, and which practically excludes the entire operation from external observation, and prevents any objectionable discharge into the open air of the vapors evolved during the operation. My said invention consists, further, in a novel portable stench-screen having close walls and a roof, which, for convenience, is adapted, by means of securing devices, to be temporarily attached to the front of the privy, and to inclose the entrance thereto, whereby the workman may, with his barrels within the screen, transfer thereto the offensive matter wholly excluded from view, and the noisome vapors confined until the operation is concluded. My invention further consists in combining with said stench-screen one or more stench-conductors, whereby the offensive vapors may be conveyed either to a sufficient height, from which it may be freely discharged into the open air without creating offense, or through which said vapors may be conducted into a deodorizing apparatus.

Figure 2:
Figure 3:
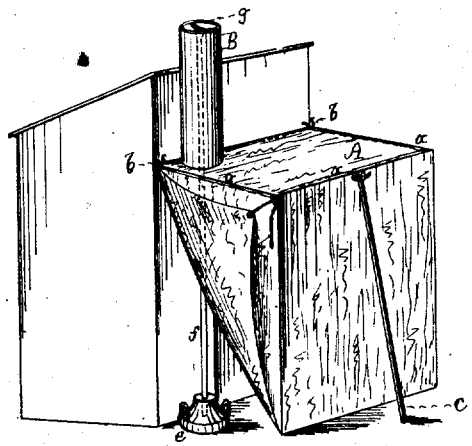
Figure 4:
Figure 5:
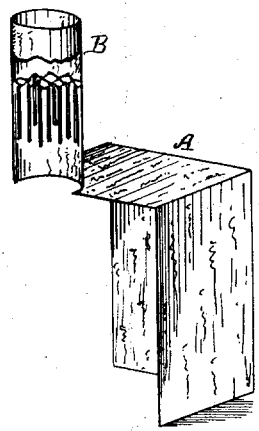

Referring to the drawings, Figure 1 represents, in perspective, one of my stench-screens as applied to a privy. Fig. 2 represents the same in vertical section. Fig. 3 represents the same with an elevated stench-conductor. Fig. 4 represents a device for supporting the stench-conductor shown in Fig. 3. Fig. 5 represents a deodorizer attached to the elevated stench-conductor.

In said figures, A denotes the stench-screen. It may be composed of any light material, or even heavy material, if it be so disposed and arranged as to admit of free portability and convenience in handling. I prefer to use canvas of ordinary quality, as in practice it is found that frequent wettings of the canvas with weak solutions of carbolic acid will not only prevent it from rotting and serve to tighten the fabric, but also result in a valuable deodorizing effect. The screen has at least three sides and a roof. A fourth side may be added, if desired, and arranged to be readily removed.

The roof portion, for convenience in handling it, is composed in part of a rectangular iron frame, as at *a*, and the walls extend therefrom to the ground, and may be there secured by driven pins in a manner well known. For attaching it to the front of a privy screw-eyes or hook-bolts, as at *b*, are preferably employed, because they can readily be applied, not only to wooden structures, but also to those of brick, by inserting them in the mortar interstices.

A chain may be employed for supporting the outer side of the roof-frame, as shown in Fig. 1. It is attached to a temporary screw-hook, also applied to the front of the privy and above the door. Instead of the chain a brace may be used, as shown at c, in Fig. 3. This latter device will be preferable, as it can be employed in all cases, while the suspending chain can only be useful when the privies extend for a sufficient distance above the doorway to admit of the location of the screw-hook.

In practice it is found that no difficulty is experienced in causing the edges of the screen adjacent to the front of the privy to maintain proper close relations, although a few tacks may be desirable in windy weather. When the corner-pins shown are properly driven into the ground there is, however, no difficulty in attaining desirable results.

B denotes a stench-conductor. In Figs. 1 and 2 it is shown to extend from the roof of a screen to a charcoal-furnace, as at $d$, through which, when a fire is burning therein, all the exhaled vapors pass and are thereby purified.

In Fig. 3 the stench-conductor is a chimney-like structure, composed of a canvas tube, which may be extended from ten to twenty-five feet above the roof if desired. It should be sustained by a convenient and portable device. I show in this figure and in Fig. 4 a heavy cast-iron socket-plate, as at $e$, provided with handles and a central socket for receiving a standard, $f$, which will preferably be of small gas-pipe. At the top of the stench-conductor is a supporting-ring, as at $g$, to which the canvas is stitched. A pintle, supported by radial arms, extends downward from the center of the ring, and is inserted into the upper end of the pipe-standard. The pipe, when carried to its full height and inserted in the socket-base, maintains the stench-conductor in proper position for conveying away the vapors.

In Fig. 5 I represent a deodorizing device for suspension in the base of the conductor. It consists merely of a number of suspended sheets or pieces of porous or fibrous material, which are well saturated with carbolic acid or other good disinfectant. They are so arranged as to afford free passage of the vapors between them, whereby, when discharged, they will be more or less thoroughly deodorized.

In practice the close screen without a stench-conductor has a marked value. The workmen are necessarily occupied in the operation for some time. Without the screen the stench is continuously apparent during the entire operation, while with the screen the stench is practically prevented from escaping until the operation is wholly completed, the barrels closed, and the surroundings sprinkled with disinfectants. On the removal of the screen, the vapors therein are promptly dissipated, and what would otherwise create a nuisance for a considerable length of time is thereby reduced to one which exists but for a few moments. With the charcoal-furnace, or other deodorizer, the operation is rendered almost unnoticeable, and closely analogous results are attainable with the elevated stench-conductor with or without a deodorizer connected therewith. The vapors are somewhat lighter than the air, owing to the heat generated by the decomposition of fecal matter, and they, therefore, rise freely, and if discharged from a height of even ten feet above the roof, or, say, even sixteen feet above the ground, they ascend sufficiently high to place them out of objectionable range.

The details of construction may be largely varied, but of numerous details known to me I have shown those of the simplest character, and those which have proven to possess practical value. The stench-screens may obviously be temporarily located above the entrance to cess-pools during the removal therefrom of such solid matter as cannot well be removed by the use of pumps.

Having thus described my invention, I claim as new and of my own invention—

1. A portable stench-screen for use in the operation of removing night-soil and other offensive matter from privies, &c., composed of inclosing walls and a roof, and provided with devices for sustaining the same closely adjacent to the outer wall of a privy, substantially as described, whereby the workmen and transit-receptacles are wholly inclosed during the transfer of the offensive matter, as set forth.

2. The combination, with a portable stench-screen, of a stench-conductor, substantially as described, whereby the offensive vapors incident to the removal of night-soil and other matter may be prevented from creating a nuisance, as set forth.

3. The combination of a portable stench-screen, a stench-conductor, and a deodorizing apparatus, substantially as described.

WILLIAM PAINTER.

Witnesses:
JAMES L. MURRILL,
JOHN F. GROUND.